(12) United States Patent
Yang et al.

(10) Patent No.: US 11,258,667 B2
(45) Date of Patent: Feb. 22, 2022

(54) NETWORK MANAGEMENT METHOD AND RELATED DEVICE

(71) Applicant: HUAWEI TECHNOLOGIES CO., LTD., Guangdong (CN)

(72) Inventors: Shuigen Yang, Shanghai (CN); Wei Lu, Shenzhen (CN); Wenqi Sun, Shenzhen (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 16/803,323

(22) Filed: Feb. 27, 2020

(65) Prior Publication Data

US 2020/0195511 A1   Jun. 18, 2020

Related U.S. Application Data

(63) Continuation of application No. PCT/CN2018/101470, filed on Aug. 21, 2018.

(30) Foreign Application Priority Data

Aug. 28, 2017 (CN) .......................... 201710753317.6

(51) Int. Cl.
  *H04W 24/04* (2009.01)
  *H04L 41/0893* (2022.01)
(52) U.S. Cl.
  CPC ......... *H04L 41/0893* (2013.01); *H04W 24/04* (2013.01)
(58) Field of Classification Search
  CPC .................................................. H04W 24/04

(Continued)

(56) References Cited

U.S. PATENT DOCUMENTS

2017/0141973 A1* 5/2017 Vrzic ................. H04L 41/5051
2018/0206152 A1   7/2018 Zhang et al.

FOREIGN PATENT DOCUMENTS

| CN | 106341832 A | 1/2017 |
| CN | 106550410 A | 3/2017 |
| CN | 106713406 A | 5/2017 |

OTHER PUBLICATIONS

Ericsson, "NSSF and Slice selection during the Registration procedure",3GPP Draft; S2-175216,XP051310199, Jul. 3, 2017, 12 pages.

(Continued)

*Primary Examiner* — Dang T Ton
(74) *Attorney, Agent, or Firm* — Fish & Richardson P.C.

(57) ABSTRACT

Example network management methods and network devices are described. One example method includes obtaining a configuration parameter by a first network device. The configuration parameter includes a network slice instance identifier and an access and mobility management function identifier corresponding to the network slice instance identifier, and/or a network slice subnet instance identifier and an access and mobility management function identifier corresponding to the network slice subnet instance identifier. The first network device sends the configuration parameter to a second network device. According to embodiments of the present disclosure, a unique access and mobility management function corresponding to a network slice instance and/or a network slice subnet instance can be selected.

16 Claims, 4 Drawing Sheets

(58) Field of Classification Search
USPC .......................................................... 370/412
See application file for complete search history.

(56) References Cited

OTHER PUBLICATIONS

Zte et al., "23.501 P-CR: Network Slicing Update for supporting standalone NSSF", 3GPP Draft, S2-174249 23.501 Clause 5.15, XP051303104, Jun. 25, 2017, 14 pages.
Extended European Search Report issued in European Application No. 18851568.8 dated Jun. 15, 2020, 7 pages.
Telecom Italia, "23.501: SMF selection in the context of Network Slicing", SA WG2 Meeting #122bis,S2-175605: Sophia Antipolis, France, Aug. 21-25, 2017, 4 pages.
3GPP TS 23.501 V1.2 0: "3rd Generation Partnership Project, Technical Specification Group Services and System Aspects, System Architecture for the 5G System, Stage 2(Release 15)", Jul. 2017, 166 pages.
PCT International Search Report and Written Opinion in International Application No. PCT/CN2018/101,470, dated Nov. 1, 2018, 15 pages (With English Translation).

* cited by examiner

NETWORK MANAGEMENT METHOD AND RELATED DEVICE

CROSS-REFERENCE TO RELATED APPLICATIONS

This application is a continuation of International Application No. PCT/CN2018/101470, filed on Aug. 21, 2018, which claims priority to Chinese Patent Application No. 201710753317.6, filed on Aug. 28, 2017. The disclosures of the aforementioned applications are hereby incorporated by reference in their entireties.

TECHNICAL FIELD

Embodiments of the present invention relate to the field of communications technologies, and in particular, to a network management method and a related device.

BACKGROUND

With rapid development of wireless communications technologies, wireless communications services will vary greatly in the future and have different forms. A 5th generation (5G) communications network is oriented to different application scenarios, for example, an ultra-high-definition video, virtual reality, the massive internet of things, and the internet of vehicles. Different scenarios have different requirements on mobility, security, a latency, reliability, and even a charge mode of a network. To meet different requirements of different services on network performance, a future network needs to have a capability of being customized based on a requirement. To be specific, a network slice needs to be flexibly configured. A physical network is sliced into a plurality of virtual network slices, and the virtual network slices are oriented to different application scenario requirements. One network slice meets a communications service requirement of one type of use case or one use case, and an entire 5G communications network includes a large quantity of network slices that meet different service requirements. In a network system, a network slice is created and applied in a form of a network slice instance and/or a network slice subnet instance. In a 5G network system, each user equipment (UE) can support one or more network slice instances and/or network slice subnet instances. When UE is registered with a telecommunications network, a network slice selection function (NSSF) is introduced into the telecommunications network to select a network slice instance and/or a network slice subnet instance for the UE, and a network function repository function (NRF) is introduced to select an access and mobility management function (AMF) corresponding to the network slice instance and/or the network slice subnet instance. After selecting a unique network slice instance and/or network slice subnet instance for the UE, the NSSF needs to determine an AMF corresponding to the network slice instance and/or the network slice subnet instance. Therefore, how to select a unique access and mobility management function corresponding to a network slice instance and/or a network slice subnet instance is a technical problem that needs to be currently resolved.

SUMMARY

Embodiments of the present invention provide a network management method and a related device, to efficiently select a unique access and mobility management function corresponding to a network slice instance and/or a network slice subnet instance.

The embodiments of the present invention may be specifically implemented by using the following technical solutions:

According to a first aspect, an embodiment of the present invention provides a network management method. The method includes: obtaining, by a first network device, a configuration parameter, where the configuration parameter includes a network slice instance (NSI) identifier (ID) and an AMF ID corresponding to the NSI ID, and/or a network slice subnet instance (NSSI) ID and an AMF ID corresponding to the NSSI ID; and then, sending, by the first network device, the configuration parameter to a second network device. This embodiment of the present invention is implemented, so that when the second network device obtains the NSI ID and/or the NSSI ID, the second network device can query the configured configuration parameter, to determine a unique AMF ID. In this way, the second network device has, by obtaining the configuration parameter sent by the first network device, a function of selecting a unique AMF corresponding to a network slice instance and/or a network slice subnet instance.

In a possible design, the configuration parameter further includes assistance information, and the assistance information is used to instruct the second network device to select a plurality of AMF IDs corresponding to the NSI ID/NSSI ID, to determine a unique AMF ID.

In a possible design, the assistance information includes one or any combination of a priority, location information, access technology information, traffic load, and a quantity of access users. The priority is used to indicate a priority of the AMF ID. The location information includes one or any combination of a tracking area identity (TAI), a routing area identity (RAI), and an evolved-universal mobile telecommunications system terrestrial radio access network cell global identifier (ECGI). The access technology information is used to indicate an access technology used when user equipment accesses a network slice instance and/or a network slice subnet instance.

In a possible design, after the first network device sends the configuration parameter to the second network device, the first network device may further obtain a configuration result sent by the second network device, where the configuration result is used to indicate a completion status of configuring the configuration parameter by the second network device.

In a possible design, the AMF ID includes a globally unique access and mobility management function identifier (GUAMI) corresponding to an AMF or an internet protocol (IP) address corresponding to the access and mobility management function.

In a possible design, the first network device is one or any combination of a network manager (NM), a domain manager (DM), an element manager (EM), a network slice management function (NSMF), a network slice subnet management function (NSSMF), a communication service management function (CSMF), a network functions virtualization orchestration (NFVO) function, and a virtualized network function manager (VNFM).

According to a second aspect, an embodiment of the present invention provides another network management method. The method includes: obtaining, by a second network device, a configuration parameter sent by a first network device, where the configuration parameter includes an NSI ID and an AMF ID corresponding to the NSI ID, and/or an NSSI ID and an AMF ID corresponding to the NSSI ID; and configuring, by the second network device, the configuration parameter. This embodiment of the present invention is implemented, so that when the second network device obtains the NSI ID and/or the NSSI ID, the second network device can query the configured configuration parameter, to determine, in the configuration parameter, a unique AMF ID corresponding to the NSI ID and/or the NSSI ID. In this way, the second network device has, by obtaining the configuration parameter sent by the first network device, a function of selecting a unique access and mobility management function corresponding to a network slice instance and/or a network slice subnet instance.

In a possible design, the configuration parameter further includes assistance information, and the assistance information is used to instruct the second network device to select a plurality of AMF IDs corresponding to the NSI ID/NSSI ID, to determine a unique AMF ID.

In a possible design, the assistance information includes one or any combination of a priority, location information, access technology information, traffic load, and a quantity of access users. The priority is used to indicate a priority of the AMF ID. The location information includes one or any combination of a tracking area identity (TAI), a routing area identity (RAI), and an evolved-universal mobile telecommunications system terrestrial radio access network cell global identifier (ECGI). The access technology information is used to indicate an access technology used when user equipment accesses a network slice instance and/or a network slice subnet instance. For example, the second network device selects an AMF having a highest priority, or selects an AMF whose location information is consistent with location information of the user equipment, or selects an AMF whose access technology information is consistent with access technology information of the user equipment, or selects an AMF with lowest traffic load; or selects an AMF with a smallest quantity of access users. The second network device may determine the unique AMF ID in the configuration parameter based on the assistance information.

In a possible design, after configuring the configuration parameter, the second network device sends a configuration result to the first network device, where the configuration result is used to indicate a completion status of configuring the configuration parameter by the second network device.

In a possible design, the AMF ID includes a GUAMI corresponding to an AMF or an IP address.

In a possible design, the first network device is one or any combination of an NM, a DM, an EM, an NSMF an NSSMF, a CSMF, an NFVO, and a VNFM.

According to a third aspect, an embodiment of the present invention provides a network device, where the network device is a first network device. The first network device includes modules or units configured to perform the network management method according to the first aspect.

According to a fourth aspect, an embodiment of the present invention provides another network device, where the network device is a second network device. The second network device includes modules or units configured to perform the network management method according to the second aspect.

According to a fifth aspect, an embodiment of the present invention provides another network device, where the network device is a first network device. The first network device includes a processor, a transceiver, and a memory. The processor is configured to invoke network management program code stored in the memory, to perform the network management method according to the first aspect.

According to a sixth aspect, an embodiment of the present invention provides another network device, where the network device is a second network device. The second network device includes a processor, a transceiver, and a memory. The processor is configured to invoke network management program code stored in the memory, to perform the network management method according to the second aspect.

According to a seventh aspect, an embodiment of the present invention provides a communications system, including a first network device and a second network device. The first network device is the first network device according to the third aspect or the fifth aspect, and the second network device is the second network device according to the fourth aspect or the sixth aspect.

According to an eighth aspect, an embodiment of the present invention provides a computer storage medium, configured to store a computer software program instruction used by the first network device according to the first aspect, where when the program instruction is executed by the first network device, the first network device is enabled to perform the method according to the first aspect.

According to a ninth aspect, an embodiment of the present invention provides another computer storage medium, configured to store a computer software program instruction used by the second network device according to the second aspect, where when the program instruction is executed by the second network device, the second network device is enabled to perform the method according to the second aspect.

According to a tenth aspect, an embodiment of the present invention provides a computer program, where the program includes a computer software program instruction, and when the program instruction is executed by a first network device, the first network device is enabled to perform the method according to the first aspect.

According to an eleventh aspect, an embodiment of the present invention provides another computer program, where the program includes a computer software program instruction, and when the program instruction is executed by a second network device, the second network device is enabled to perform the method according to the second aspect.

In a possible design, the first network device may be network slice management and orchestration (NSMAO), and the second network device may be a network function repository function (NRF).

DESCRIPTION OF EMBODIMENTS

First, concepts of a network slice, a network slice instance, a network slice subnet instance, and a network function in the embodiments of the present invention are described.

Network slices (NS) are different logical networks customized based on different service requirements. A network slice may be a complete end-to-end network including a terminal, an access network, a transport network, a core network, and an application server. The network slice can provide a complete telecommunication service and has a particular network capability. Alternatively, the network slice may be any combination of the terminal, the access network, the transport network, the core network, and the application server.

The network slice instance (NSI) is instantiation for the NS. To be specific, the network slice instance is an actually running logical network, and can meet a particular network feature or service requirement. One network slice instance may provide one or more services. The network slice instance may be created by a network slice management function device. One network slice management function device may create and manage a plurality of network slice instances, for example, perform performance monitoring and fault management in a running process of the network slice instances. When a plurality of network slice instances coexist, the network slice instances may share some network resources and network functions. The network slice instance may be created from a network slice template, or may not be created from a network slice template. A complete network slice instance can provide a complete end-to-end network service, and a network slice instance may include a network slice subnet instance (NSSI) and/or a network function. The network function may include a physical network function and/or a virtual network function. The physical network function and/or the virtual network function are/is collectively referred to as the network function below.

One network slice instance may be divided into several network slice subnet instances, to facilitate management performed by a network management system. The network slice subnet instance may not need to provide a complete end-to-end network service. The network slice subnet instance may be a set of network functions of a same device vendor in the network slice instance; or may be a set of network functions obtained through domain-based division, for example, a core network slice subnet instance and an access network slice subnet instance; or may be a set formed based on a deployment location or in another manner. One network slice subnet instance may be shared by a plurality of network slice instances.

The network function (NF) is a processing function in a network, and defines a functional behavior and interface. The network function may be implemented by using special-purpose hardware, or may be implemented by running software on special-purpose hardware, or may be implemented in a form of a virtual function on a general-purpose hardware platform. Therefore, from a perspective of implementation, the network function may be classified into a physical network function and a virtual network function. From a perspective of use, the network function may be classified into a dedicated network function and a shared network function. Specifically, a plurality of network slice instances/network slice subnet instances may independently use different network functions, and these network functions are referred to as dedicated network functions. Alternatively, a plurality of network slice instances/network slice subnet instances may share a same network function, and the network function is referred to as a shared network function.

One network management system may create and manage a plurality of network slice instances, for example, modify and terminate the plurality of network slice instances, and perform performance monitoring and fault management on the plurality of network slice instances in a running process of the network slice instances. A complete network slice instance can provide a complete end-to-end network service, and a network slice instance may include a network slice subnet instance and/or a network function. A network slice instance is identified by a network slice instance identifier (NSI ID). Correspondingly, a network slice subnet instance is identified by a network slice subnet instance identifier (NSSI ID). For example, the NSI ID and the NSSI ID may be character strings, or may be names that can be understood by human beings.

When user equipment is registered with a telecommunications network, the network needs to select a unique network slice instance/network slice subnet instance for the user equipment based on single network slice selection assistance information (S-NSSAI) corresponding to the user equipment. In addition, the network further needs to select an appropriate access and mobility management function (AMF) for the user equipment based on the selected network slice instance/network slice subnet instance. The AMF is a core network element, and is mainly responsible for signaling processing, namely, control plane functions, including functions such as access control, mobility management, attachment, detachment, and gateway selection.

Figure 1:
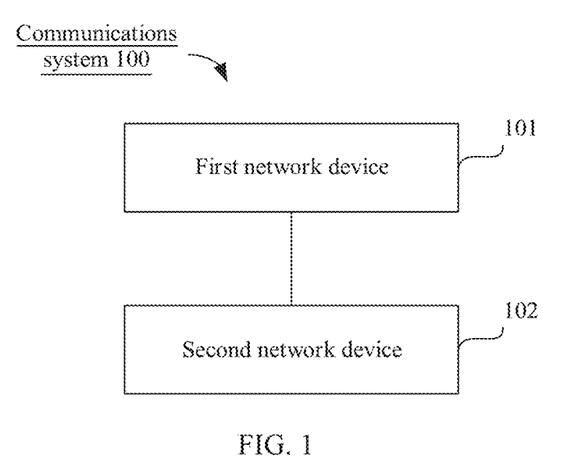
FIG. 1 is a schematic architectural diagram of a network system according to an embodiment of the present invention.

FIG. 1 is a schematic architectural diagram of a network system according to an embodiment of the present invention. As shown in FIG. 1, the network system 100 includes a first network device 101 and a second network device 102.

The first network device 101 is mainly responsible for managing a lifecycle, performance, a fault, a configuration, and the like of an NSI/NSSI, and orchestrating components of the NSI/NSSI. The lifecycle management, performance management, fault management, configuration management, orchestration, and the like of the NSI/NSSI and the components (for example, a slice subnet instance and a network function) of the NSI/NSSI are collectively referred to as management. The first network device 101 may be a network manager (NM), a domain manager (DM), an element manager (EM), a network slice management function (NSMF), a network slice subnet management function (NSSMF), a communication service management function (CSMF), a network functions virtualization orchestration (NFVO) function, or a virtualized network function manager (VNFM), or may be any combination of the foregoing modules, for example, a combination of the NSMF and the EM, or a combination of the NSSMF and the EM. A name of the first network device 101 includes, but is not limited to, network slice management and orchestration (NSMAO). A name of the second network device 102 includes, but is not limited to, a network function repository function (NRF).

Main functions of the second network device 102 include: supporting a service discovery function, providing related NF instance information, maintaining information between an available NF instance and a service supported by the NF instance, and being responsible for selecting, based on an identifier of an NSI/NSSI, an AMF associated with the NSI/NSSI.

In a specific application, the first network device 101 may be any device that has the functions of the first network device 101, and the second network device 102 may be any device that has the functions of the second network device 102.

Figure 2:
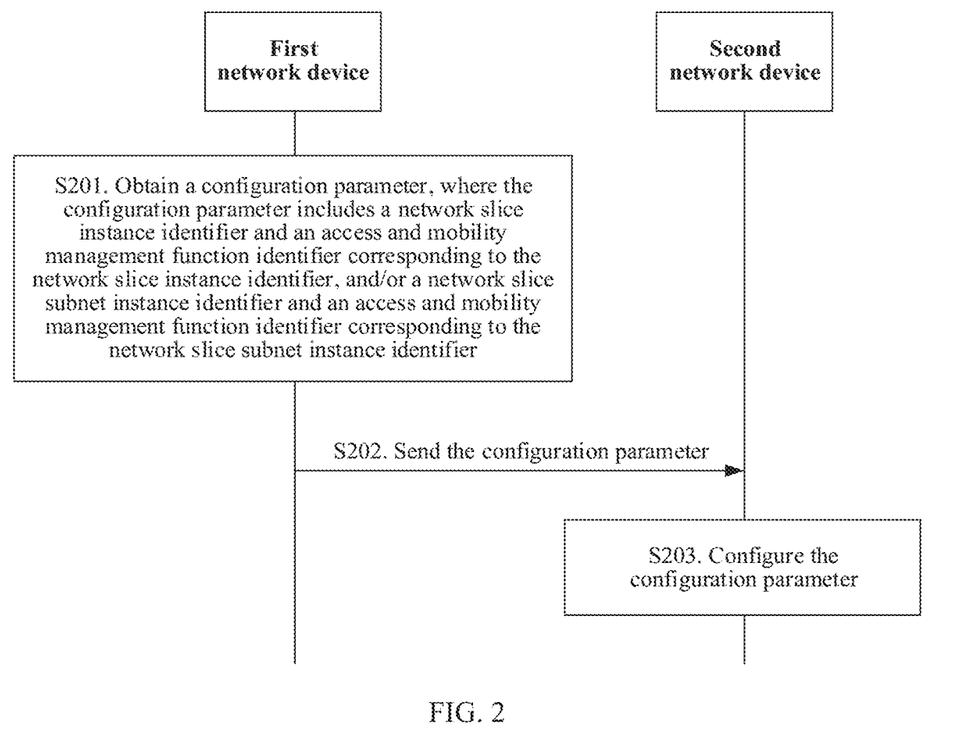
FIG. 2 is a flowchart of a network management method according to an embodiment of the present invention.

Based on FIG. 1, namely, the schematic diagram of a communications architecture, FIG. 2 is a flowchart of a network management method according to an embodiment of the present invention. The network management method includes, but is not limited to, the following steps S201 to S203.

S201. The first network device obtains a configuration parameter, where the configuration parameter includes a network slice instance identifier and an access and mobility management function identifier corresponding to the network slice instance identifier, and/or a network slice subnet instance identifier and an access and mobility management function identifier corresponding to the network slice subnet instance identifier.

The first network device may store a capability of supporting a specific NSI/NSSI by each AMF, and the first network device may determine, based on the capability of each AMF, an AMF corresponding to each NSI ID/NSSI ID. An AMF corresponding to an NSI ID means that the AMF has a capability of providing the NSI, and an AMF corresponding to an NSSI ID means that the AMF has a capability of providing the NSSI.

The configuration parameter is used to be configured on the second network device.

Optionally, the first network device may be an NSMAO. The second network device may be an NRF.

The first network device generates the configuration parameter or obtains the configuration parameter from another network device, or a network administrator enters the configuration parameter into the first network device.

In an embodiment, the configuration parameter includes a correspondence between the NSI ID and the AMF ID. In another embodiment, the configuration parameter includes a correspondence between the NSSI ID and the AMF ID. In another embodiment, the configuration parameter includes a correspondence between the NSI ID and the AMF ID and a correspondence between the NSSI ID and the AMF ID. In another embodiment, the configuration parameter includes a correspondence between the NSI ID, the NSSI ID, and the AMF ID.

In this embodiment of the present invention, the AMF ID includes a GUAMI corresponding to an AMF or an IP address. The GUAMI is used to identify a globally unique AMF identity. The GUAMI is composed as follows: <GUAMI>:=<MCC> <MNC> <AMF Region ID> <AMF Set ID> <AMF Pointer>. The AMF Region ID is used to identify a region. The AMF Set ID is used to uniquely identify an AMF set in the region. The AMF Pointer is used to uniquely identify an AMF in the set. The GUAMI may be a fully qualified domain name (FQDN).

In an embodiment, each NSI ID/NSSI ID in the configuration parameter may correspond to only one AMF. In this case, one NSI ID/NSSI ID corresponds to one AMF ID, and content included in the configuration parameter and formats of the content may be, for example, shown in any one of Table 1 to Table 6.

TABLE 1

| NSI ID | AMF ID |
|---|---|
| 1 | 001 |
| 2 | 002 |
| 3 | 003 |

TABLE 2

| NSI ID | AMF IP |
|---|---|
| 1 | 224.000.0.1 |
| 2 | 225.000.0.1 |
| 3 | 226.000.0.1 |

TABLE 3

| NSSI ID | AMF ID |
|---|---|
| 01 | 001 |
| 02 | 002 |
| 03 | 003 |

TABLE 4

| NSSI ID | AMF IP |
|---|---|
| 01 | 224.000.0.1 |
| 02 | 225.000.0.1 |
| 03 | 226.000.0.1 |

TABLE 5

| NSI ID/NSSI ID | AMF ID |
|---|---|
| 1 | 001 |
| 2 | 002 |
| 3 | 003 |
| 01 | 001 |
| 02 | 002 |
| 03 | 003 |

TABLE 6

| NSI ID/NSSI ID | AMF IP |
|---|---|
| 1 | 224.000.0.1 |
| 2 | 225.000.0.1 |
| 3 | 226.000.0.1 |
| 01 | 224.000.0.1 |
| 02 | 225.000.0.1 |
| 03 | 226.000.0.1 |

In Table 1, an NSI 1 whose NSI ID is 1 corresponds to an identifier 001 of an AMF 1, an NSI 2 whose NSI ID is 2 corresponds to an identifier 002 of an AMF 2, and an NSI 3 whose NSI ID is 3 corresponds to an identifier 003 of an AMF 3. In Table 2, an NSI 1 whose NSI ID is 1 corresponds to an identifier 224.000.0.1 of an AMF 1, an NSI 2 whose NSI ID is 2 corresponds to an identifier 225.000.0.1 of an AMF 2, and an NSI 3 whose NSI ID is 3 corresponds to an identifier 226.000.0.1 of an AMF 3. In Table 3, an NSSI 1 whose NSSI ID is 01 corresponds to an identifier 001 of an AMF 1, an NSSI 2 whose NSSI ID is 02 corresponds to an identifier 002 of an AMF 2, and an NSSI 3 whose NSSI ID is 03 corresponds to an identifier 003 of an AMF 3. In Table 4, an NSSI 1 whose NSSI ID is 01 corresponds to an identifier 224.000.0.1 of an AMF 1, an NSSI 2 whose NSSI ID is 02 corresponds to an identifier 225.000.0.1 of an AMF 2, and an NSSI 3 whose NSSI ID is 03 corresponds to an identifier 226.000.0.1 of an AMF 3. The foregoing NSI IDs, NSSI IDs, AMF IDs, and AMF IPs are only used as examples, and do not limit formats of the NSI ID, the NSSI ID, the AMF ID, and the AMF IP. In Table 5, the configuration parameter includes both a correspondence between an NSI ID and an AMF ID and a correspondence between an NSSI ID and an AMF ID. In Table 6, the configuration parameter includes both a correspondence between an NSI ID and an AMF IP and a correspondence between an NSSI ID and an AMF IP.

It can be learned from Table 1 to Table 6 that one NSI ID/NSSI ID corresponds to only one AMF ID/AMF IP. Therefore, the second network device can uniquely determine, based on the NSI ID/NSSI ID, an AMF corresponding to the NSI ID/NSSI ID.

In another embodiment, alternatively, each NSI ID/NSSI ID in the configuration parameter may correspond to two or more AMFs. In this case, one NSI ID/NSSI ID corresponds to at least two AMF IDs, and content included in the configuration parameter and formats of the content may be, for example, shown in any one of Table 7 to Table 12.

TABLE 7

| NSI ID | AMF ID |
|---|---|
| 1 | 001 |
| 1 | 002 |
| 2 | 001 |
| 2 | 003 |
| 3 | 001 |
| 3 | 002 |
| 3 | 003 |

TABLE 8

| NSI ID | AMF IP |
|---|---|
| 1 | 224.000.0.1 |
| 1 | 225.000.0.1 |
| 2 | 224.000.0.1 |
| 2 | 226.000.0.1 |
| 3 | 224.000.0.1 |
| 3 | 225.000.0.1 |
| 3 | 226.000.0.1 |

TABLE 9

| NSSI ID | AMF ID |
|---|---|
| 01 | 001 |
| 01 | 002 |
| 02 | 001 |
| 02 | 003 |
| 03 | 001 |
| 03 | 002 |
| 03 | 003 |

TABLE 10

| NSSI ID | AMF IP |
|---|---|
| 01 | 224.000.0.1 |
| 01 | 225.000.0.1 |
| 02 | 224.000.0.1 |
| 02 | 226.000.0.1 |
| 03 | 224.000.0.1 |
| 03 | 225.000.0.1 |
| 03 | 226.000.0.1 |

TABLE 11

| NSI ID/NSSI ID | AMF ID |
|---|---|
| 1 | 001 |
| 1 | 002 |
| 2 | 001 |
| 2 | 003 |
| 3 | 001 |
| 3 | 002 |
| 3 | 003 |
| 01 | 001 |
| 01 | 002 |
| 02 | 001 |
| 02 | 003 |
| 03 | 001 |
| 03 | 002 |
| 03 | 003 |

TABLE 12

| NSI ID/NSSI ID | AMF IP |
|---|---|
| 1 | 224.000.0.1 |
| 1 | 225.000.0.1 |
| 2 | 224.000.0.1 |
| 2 | 226.000.0.1 |
| 3 | 224.000.0.1 |
| 3 | 225.000.0.1 |
| 3 | 226.000.0.1 |
| 01 | 224.000.0.1 |
| 01 | 225.000.0.1 |
| 02 | 224.000.0.1 |
| 02 | 226.000.0.1 |
| 03 | 224.000.0.1 |
| 03 | 225.000.0.1 |
| 03 | 226.000.0.1 |

In Table 7, an NSI 1 whose NSI ID is 1 corresponds to an identifier 001 of an AMF 1 and an identifier 002 of an AMF 2, an NSI 2 whose NSI ID is 2 corresponds to the identifier 001 of the AMF 1 and an identifier 003 of an AMF 3, and an NSI 3 whose NSI ID is 3 corresponds to the identifier 001 of the AMF 1, the identifier 002 of the AMF 2, and the identifier 003 of the AMF 3. In Table 8, an NSI 1 whose NSI ID is 1 corresponds to an identifier 224.000.0.1 of an AMF 1 and an identifier 225.000.0.1 of an AMF 2, an NSI 2 whose NSI ID is 2 corresponds to the identifier 224.000.0.1 of the AMF 1 and an identifier 226.000.0.1 of an AMF 3, and an NSI 3 whose NSI ID is 3 corresponds to the identifier 224.000.0.1 of the AMF 1, the identifier 225.000.0.1 of the AMF 2, and the identifier 226.000.0.1 of the AMF 3. In Table 9, an NSSI 1 whose NSSI ID is 01 corresponds to an identifier 001 of an AMF 1 and an identifier 002 of an AMF 2, an NSSI 2 whose NSSI ID is 02 corresponds to the identifier 001 of the AMF 1 and an identifier 003 of an AMF 3, and an NSSI 3 whose NSSI ID is 03 corresponds to the identifier 001 of the AMF 1, the identifier 002 of the AMF 2, and the identifier 003 of the AMF 3. In Table 10, an NSSI 1 whose NSSI ID is 01 corresponds to an identifier 224.000.0.1 of an AMF 1 and an identifier 225.000.0.1 of an AMF 2, an NSSI 2 whose NSSI ID is 02 corresponds to the identifier 224.000.0.1 of the AMF 1 and an identifier 226.000.0.1 of an AMF 3, and an NSSI 3 whose NSSI ID is 03 corresponds to the identifier 224.000.0.1 of the AMF 1, the identifier 225.000.0.1 of the AMF 2, and the identifier 226.000.0.1 of the AMF 3. In Table 11, the configuration parameter includes both a correspondence between an NSI ID and an AMF ID and a correspondence between an NSSI ID and an AMF ID. In Table 12, the configuration parameter includes both a correspondence between an NSI ID and an AMF IP and a correspondence between an NSSI ID and an AMF IP.

It can be learned from Table 7 to Table 12 that one NSI ID/NSSI ID corresponds to at least two AMF IDs/AMF IPs. Therefore, the second network device can determine, based on the NSI ID/NSSI ID, at least two AMFs corresponding to the NSI ID/NSSI ID.

Optionally, when one NSI ID/NSSI ID corresponds to at least two AMF IDs/AMF IPs, the configuration parameter may further include assistance information corresponding to AMFs, and the assistance information is used to instruct the second network device to select the AMF IDs. The assistance information includes, but is not limited to, one or any combination of a priority, location information, access technology information, traffic load, and a quantity of access users. The priority is used to indicate a priority of an AMF ID. The location information includes one or any combination of a tracking area identity (TAI), a routing area identity (RAI), and an evolved-universal mobile telecommunications system terrestrial radio access network cell global identifier (ECGI). The access technology information is used to indicate an access technology used when user equipment accesses a network slice instance and/or a network slice subnet instance. The assistance information may alternatively be any combination of the priority, the location information, the access technology information, the traffic load, and the quantity of access users.

For example, the correspondence between an NSI ID and an AMF ID that is shown in Table 1 is used as an example. For content included in the configuration parameter, refer to Table 13.

TABLE 13

| NSI ID | AMF ID | AMF priority |
|--------|--------|--------------|
| 1      | 001    | 1            |
| 2      | 002    | 2            |
| 3      | 003    | 3            |

As shown in Table 13, the first network device and the second network device may negotiate in advance that a smaller priority sequence number indicates a higher priority, and a larger priority sequence number indicates a lower priority. Therefore, priorities of the AMF 001 to the AMF 003 are the AMF 001, the AMF 002, and the AMF 003 in descending order.

Optionally, a same AMF may have different priorities for different NSIs/NSSIs. For example, referring to Table 14, for an NSI ID 1, a priority of an AMF whose AMF ID is 001 is 1, and a priority of an AMF whose AMF ID is 002 is 2; and for an NSI ID 3, a priority of the AMF whose AMF ID is 001 is 3, and a priority of the AMF whose AMF ID is 002 is 2.

TABLE 14

| NSI ID | AMF ID | AMF priority |
|--------|--------|--------------|
| 1      | 001    | 1            |
| 1      | 002    | 2            |
| 2      | 001    | 1            |
| 2      | 003    | 2            |

TABLE 14-continued

| NSI ID | AMF ID | AMF priority |
|--------|--------|--------------|
| 3      | 001    | 3            |
| 3      | 002    | 2            |
| 3      | 003    | 1            |

S202. The first network device sends the configuration parameter to the second network device.

The first network device may add the configuration parameter to a management request or a configuration request, and send the management request or the configuration request to the second network device.

In this embodiment of the present invention, if the configuration parameter includes a plurality of correspondences between an NSI ID/NSSI ID and an AMF ID, the first network device may send a management request to the second network device for a plurality of times, where the management request sent each time includes one correspondence. Using Table 1 as an example, there are three correspondences: a correspondence between the NSI ID 1 and the AMF ID 001, a correspondence between the NSI ID 2 and the AMF ID 002, and a correspondence between the NSI ID 3 and the AMF ID 003. The first network device may send a management request to the second network device for three times. The management request sent for the first time carries the correspondence between the NSI ID 1 and the AMF ID 001, the management request sent for the second time carries the correspondence between the NSI ID 2 and the AMF ID 002, and the management request sent for the third time carries the correspondence between the NSI ID 3 and the AMF ID 003. Alternatively, the first network device may send a management request to the second network device for only one time, and the management request includes a plurality of correspondences. Using Table 1 as an example, there are three correspondences. The first network device may send a management request to the second network device for only one time. The management request carries the correspondence between the NSI ID 1 and the AMF ID 001, the correspondence between the NSI ID 2 and the AMF ID 002, and the correspondence between the NSI ID 3 and the AMF ID 003.

S203. The second network device configures the configuration parameter.

In this embodiment of the present invention, when receiving a selection request used to select an AMF, the second network device determines, based on a network slice instance identifier/network slice subnet instance identifier carried in the selection request and the correspondence, a target AMF corresponding to the network slice instance identifier and/or the network slice subnet instance identifier.

A target AMF ID corresponding to the network slice instance identifier/network slice subnet instance identifier may be a GUAMI corresponding to the target AMF, or may be an IP address of the target AMF. If the target AMF ID is the IP address of the target AMF, the second network device may send the IP address of the target AMF to an NSSF, and then the NSSF sends the IP address of the target AMF to an initial AMF. In this way, the initial AMF can directly obtain the IP address of the target AMF. Compared with a manner in which the second network device sends the GUAMI of the target AMF to the NSSF, the NSSF sends the GUAMI of the target AMF to the initial AMF, and then the AMF obtains, by using a domain name system (DNS), the IP address corresponding to the GUAMI of the target AMF, this manner enables the initial AMF to directly obtain the IP address of the target AMF instead of further parsing the AMF ID, so that a processing procedure of the initial AMF is reduced, and signaling overheads are reduced.

In an embodiment, each network slice instance identifier/network slice subnet instance identifier corresponds to one AMF ID. In this case, the second network device may uniquely determine, by searching the configuration parameter based on the network slice instance identifier/network slice subnet instance identifier, an AMF ID corresponding to the network slice instance identifier/network slice subnet instance identifier. Using Table 1 as an example, if the network slice instance identifier is 1, the second network device may determine, by searching the configuration parameter shown in Table 1, that a target AMF ID corresponding to 1 is 001. Using Table 2 as an example, if the network slice instance identifier is 1, the second network device may determine, by searching the configuration parameter shown in Table 2, that a target AMF ID corresponding to 1 is 224.000.0.1. Using Table 3 as an example, if the network slice subnet instance identifier is 01, the second network device may determine, by searching the configuration parameter shown in Table 3, that a target AMF ID corresponding to 01 is 001. Using Table 4 as an example, if the network slice subnet instance identifier is 01, the second network device may determine, by searching the configuration parameter shown in Table 4, that a target AMF ID corresponding to 01 is 224.000.0.1.

In another embodiment, each network slice instance identifier/network slice subnet instance identifier corresponds to two or more AMF IDs. Because one network slice instance identifier/network slice subnet instance identifier corresponds to at least two AMF identifiers, the second network device needs to determine a target AMF ID from the at least two AMF IDs with reference to the assistance information sent by the first network device, where the assistance information is used by the second network device to select one of a plurality of AMF IDs corresponding to the network slice instance identifier/network slice subnet instance identifier. After obtaining the assistance information, and when receiving the selection request used to select an AMF, the second network device determines, based on the network slice instance identifier/network slice subnet instance identifier carried in the selection request, the correspondence, and the assistance information, the target AMF corresponding to the network slice instance identifier/network slice subnet instance identifier. For example, after receiving the NSI ID/NSSI ID, the second network device selects, based on priorities of AMFs, an AMF with a highest priority from the AMFs corresponding to the NSI ID/NSSI ID. Alternatively, the second network device obtains location information of the user equipment, and selects an AMF that is in AMFs corresponding to the NSI ID/NSSI ID and whose location information is consistent with the location information of the user equipment. Alternatively, the second network device obtains an access technology of the user equipment, and selects an AMF that is in AMFs corresponding to the NSI ID/NSSI ID and whose access technology is consistent with the access technology of the user equipment. Alternatively, the second network device obtains current traffic load of each of AMFs corresponding to the NSI ID/NSSI ID, and selects an AMF with smallest traffic load. Alternatively, the second network device obtains a quantity of users currently accessing each of AMFs corresponding to the NSI ID/NSSI ID, and selects an AMF with a smallest quantity of access users.

For example, for Table 14, if the network slice instance identifier is 1, the second network device may determine, by searching the configuration parameter shown in Table 14, that AMF IDs corresponding to 1 include 001 and 002, and a priority of the AMF 001 is higher than that of the AMF 002. In this case, the second network device finally determines that a target AMF ID corresponding to 1 is 001.

For another example, for Table 8, the assistance information is used to select the target AMF based on current traffic load of an AMF. If the network slice instance identifier is 1, the second network device may determine, by searching the configuration parameter shown in Table 8, that AMF IDs corresponding to 1 include 224.000.0.1 and 225.000.0.1, and the second network device learns that traffic load of the AMF 1 corresponding to 224.000.0.1 is 90% and traffic load of the AMF 2 corresponding to 225.000.0.1 is 10%. In this case, the second network device finally determines that a target AMF ID corresponding to 1 is 225.000.0.1.

For another example, for Table 9, the assistance information is used to select the target AMF based on a quantity of users accessing an AMF. If the network slice subnet instance identifier is 01, the second network device may determine, by searching the configuration parameter shown in Table 9, that AMF IDs corresponding to 01 include 001 and 002, and the second network device learns that a quantity of users accessing the AMF 1 corresponding to 001 is 1000 and a quantity of users accessing the AMF 2 corresponding to 002 is 10. In this case, the second network device finally determines that a target AMF ID corresponding to 01 is 002.

Optionally, after configuring the configuration parameter, the second network device may further send a configuration result to the first network device, where the configuration result is used to indicate a completion status of configuring the configuration parameter by the second network device.

This embodiment of the present invention is implemented, so that the first network device sends the correspondence between the access and mobility management function identifier and the network slice instance identifier and/or the network slice subnet instance identifier. When receiving the selection request used to select an access and mobility management function, the second network device may determine, based on the network slice instance identifier and/or the network slice subnet instance identifier carried in the selection request and the correspondence, the access and mobility management function corresponding to the network slice instance identifier and/or network slice subnet instance identifier. Therefore, the access and mobility management function corresponding to the network slice instance and/or the network slice subnet instance can be efficiently selected. If there are a plurality of access and mobility management functions corresponding to the network slice instance and/or the network slice subnet instance, the second network device may further determine one of the plurality of access and mobility management functions with reference to the assistance information sent by the first network device.

To better implement the foregoing network management method in the embodiments of the present invention, the present invention further provides a related device configured to implement the foregoing method.

Figure 3:
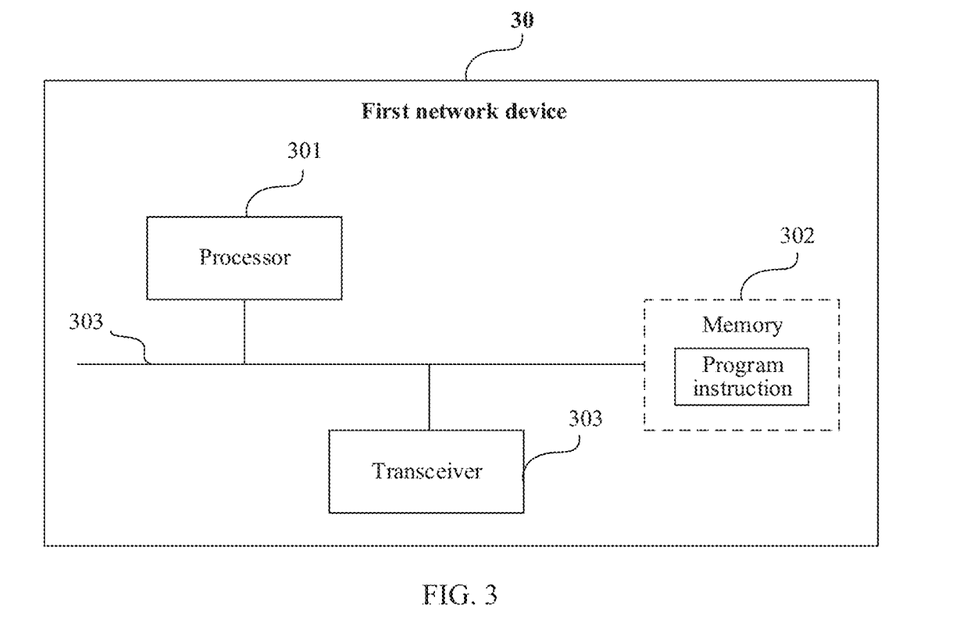
FIG. 3 is a schematic structural diagram of a network device according to an embodiment of the present invention.

FIG. 3 is a schematic structural diagram of a network device according to an embodiment of the present invention. As shown in FIG. 3, a first network device 30 includes a processor 301 and a transceiver 303. Optionally, the first network device 30 may further include a memory 302. The processor 301, the memory 302, and the transceiver 303 may be connected through a bus or in another manner. In this embodiment of the present invention, an example in which the processor 301, the memory 302, and the transceiver 303 may be connected through a bus 304 is used for description.

In some possible implementations, the first network device 30 may further include a module not shown in FIG. 3.

The processor 301 may be a general-purpose processor such as a central processing unit (CPU), or may be a digital signal processor (DSP), an application-specific integrated circuit (ASIC), or one or more integrated circuits configured to implement this embodiment of the present invention. The processor 301 may process data that is received by using the transceiver 303. The processor 301 may further process data that is to be sent to the transceiver 303.

The memory 302 is configured to store a program instruction and/or data, and transmit the program instruction to the CPU. The memory 302 may include a volatile memory, for example, a random access memory (RAM). The memory 302 may also include a non-volatile memory, for example, a read-only memory (ROM), a flash memory, a hard disk drive (HDD), or a solid-state drive (SSD). The memory 302 may alternatively include a combination of the foregoing types of memories. The memory 302 is connected to the processor 301 through the bus.

The transceiver 303 is configured to perform data communication between the first network device 30 and another device, for example, perform data communication with a second network device.

In this embodiment of the present invention, the processor 301 is configured to invoke the program instruction and data that are stored in the memory 302, to perform the following operations:

obtaining a configuration parameter, where the configuration parameter includes a network slice instance identifier and an access and mobility management function identifier corresponding to the network slice instance identifier, and/or a network slice subnet instance identifier and an access and mobility management function identifier corresponding to the network slice subnet instance identifier; and sending the configuration parameter to the second network device by using the transceiver 303.

Optionally, the configuration parameter further includes assistance information, and the assistance information is used to instruct the second network device to select the access and mobility management function identifier.

Optionally, the assistance information includes one or any combination of a priority, location information, access technology information, traffic load, and a quantity of access users.

The priority is used to indicate a priority of the access and mobility management function identifier.

The location information includes one or any combination of a tracking area identity TAI, a routing area identity RAI, and an evolved-universal mobile telecommunications system terrestrial radio access network cell global identifier ECGI.

The access technology information is used to indicate an access technology used when user equipment accesses a network slice instance and/or a network slice subnet instance.

Optionally, after the processor 301 sends the configuration parameter to the second network device by using the transceiver 303, the processor 301 is further configured to obtain, by using the transceiver 303, a configuration result sent by the second network device, where the configuration result is used to indicate a completion status of configuring the configuration parameter by the second network device.

Optionally, the access and mobility management function identifier includes a globally unique access and mobility management function identifier corresponding to an access and mobility management function or an internet protocol address of the access and mobility management function.

Optionally, the first network device 30 is one or any combination of a network manager NM, a domain manager DM, an element manager EM, a network slice management function NSMF, a network slice subnet management function NSSMF, a communication service management function CSMF, a network functions virtualization orchestration NFVO function, and a virtualized network function manager VNFM.

Optionally, the first network device 30 is the foregoing NSMAO, and the second network device is an NRF.

It should be noted that, for functions of the functional modules of the first network device 30 described in this embodiment of the present invention, refer to the related descriptions corresponding to the first network device in the embodiment shown in FIG. 2. Details are not described herein again.

Figure 4:
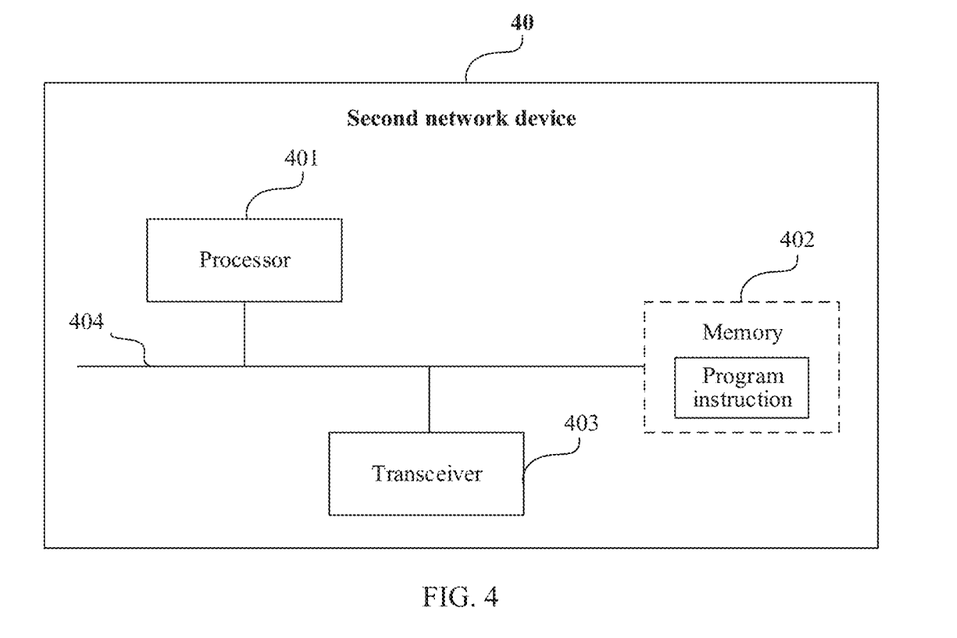
FIG. 4 is a schematic structural diagram of another network device according to an embodiment of the present invention.

FIG. 4 is a schematic structural diagram of another network device according to an embodiment of the present invention. As shown in FIG. 4, a second network device 40 may include a processor 401 and a transceiver 403. Optionally, the second network device 40 may further include a memory 402. The processor 401, the memory 402, and the transceiver 403 may be connected through a bus or in another manner. In this embodiment of the present invention, an example in which the processor 401, the memory 402, and the transceiver 403 may be connected through a bus 404 is used for description.

In some possible implementations, the second network device 40 may further include a module not shown in FIG. 4.

The processor 401 may be a general-purpose processor such as a CPU, or may be a DSP, an ASIC, or one or more integrated circuits configured to implement this embodiment of the present invention. The processor 401 may process data that is received by using the transceiver 403. The processor 401 may further process data that is to be sent to the transceiver 403.

The memory 402 is configured to store a program instruction and/or data, and transmit the program instruction to the CPU. The memory 402 may include a volatile memory, for example, a RAM. The memory 402 may also include a non-volatile memory, for example, a ROM, a flash memory, an HDD, or an SSD. Alternatively, the memory 402 may include a combination of the foregoing types of memories. The memory 402 is connected to the processor 401 through the bus.

The transceiver 403 is configured to perform data communication between the second network device 40 and another device, for example, perform data communication with a first network device.

In this embodiment of the present invention, the processor 401 is configured to invoke the program instruction and data that are stored in the memory 402, to perform the following operations:

obtaining, by using the transceiver 403, a configuration parameter sent by the first network device, where the configuration parameter includes a network slice instance identifier and an access and mobility management function identifier corresponding to the network slice instance identifier, and/or a network slice subnet instance identifier and an access and mobility management function identifier corresponding to the network slice subnet instance identifier; and configuring the configuration parameter.

Optionally, the configuration parameter further includes assistance information, and the assistance information is used to instruct the second network device 40 to select the access and mobility management function identifier.

Optionally, the assistance information includes one or any combination of a priority, location information, access technology information, traffic load, and a quantity of access users.

The priority is used to indicate a priority of the access and mobility management function identifier.

The location information includes one or any combination of a tracking area identity TAI, a routing area identity RAI, and an evolved-universal mobile telecommunications system terrestrial radio access network cell global identifier ECGI.

The access technology information is used to indicate an access technology used when user equipment accesses a network slice instance and/or a network slice subnet instance.

Optionally, after configuring the configuration parameter, the processor 401 is further configured to:

send a configuration result to the first network device by using the transceiver 403, where the configuration result is used to indicate a completion status of configuring the configuration parameter by the second network device 40.

Optionally, the access and mobility management function identifier includes a globally unique access and mobility management function identifier corresponding to an access and mobility management function or an internet protocol address of the access and mobility management function.

Optionally, the first network device is one or any combination of a network manager NM, a domain manager DM, an element manager EM, a network slice management function NSMF, a network slice subnet management function NSSMF, a communication service management function CSMF, a network functions virtualization orchestration NFVO function, and a virtualized network function manager VNFM.

Optionally, the first network device is the foregoing NSMAO, and the second network device 40 is an NRF.

It should be noted that, for functions of the functional modules of the second network device 40 described in this embodiment of the present invention, refer to the related descriptions corresponding to the second network device in the embodiment shown in FIG. 2. Details are not described herein again.

Figure 5:
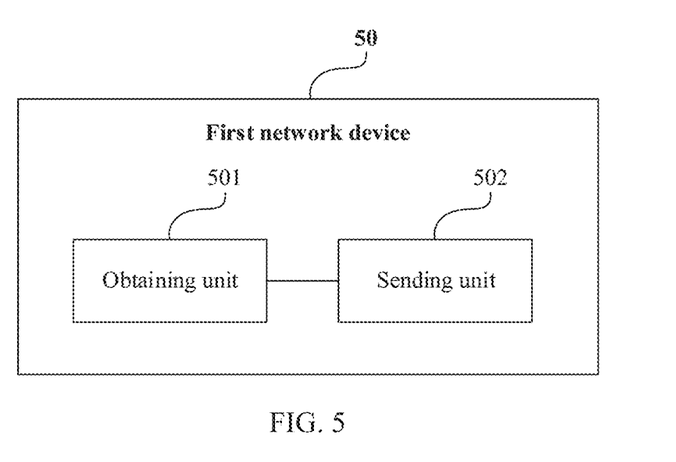
FIG. 5 is a schematic structural diagram of another network device according to an embodiment of the present invention.

FIG. 5 is a schematic structural diagram of another network device according to an embodiment of the present invention. As shown in FIG. 5, a first network device 50 includes an obtaining unit 501 and a sending unit 502.

In this embodiment of the present invention, the obtaining unit 501 is configured to obtain a configuration parameter, where the configuration parameter includes a network slice instance identifier and an access and mobility management function identifier corresponding to the network slice instance identifier, and/or a network slice subnet instance identifier and an access and mobility management function identifier corresponding to the network slice subnet instance identifier; and the sending unit 502 is configured to send the configuration parameter to a second network device.

In this embodiment, the first network device 50 is presented in a form of functional units. The "unit" herein may be an ASIC, a processor executing one or more software or firmware programs and a memory, an integrated logic circuit, and/or another component that can provide the foregoing functions. The first network device 50 may be in a form shown in FIG. 3. The obtaining unit 501 may be implemented by the processor 301 in FIG. 3. The sending unit 502 may be implemented by the transceiver 303 in FIG. 3.

Optionally, the configuration parameter further includes assistance information, and the assistance information is used to instruct the second network device to select the access and mobility management function identifier.

Optionally, the assistance information includes one or any combination of a priority, location information, access technology information, traffic load, and a quantity of access users.

The priority is used to indicate a priority of the access and mobility management function identifier.

The location information includes one or any combination of a tracking area identity TAI, a routing area identity RAI, and an evolved-universal mobile telecommunications system terrestrial radio access network cell global identifier ECGI.

The access technology information is used to indicate an access technology used when user equipment accesses a network slice instance and/or a network slice subnet instance.

Optionally, the obtaining unit 501 is further configured to: after the sending unit 502 sends the configuration parameter to the second network device, obtain a configuration result sent by the second network device, where the configuration result is used to indicate a completion status of configuring the configuration parameter by the second network device.

Optionally, the access and mobility management function identifier includes a globally unique access and mobility management function identifier corresponding to an access and mobility management function or an internet protocol address of the access and mobility management function.

Optionally, the first network device 50 is one or any combination of a network manager NM, a domain manager DM, an element manager EM, a network slice management function NSMF, a network slice subnet management function NSSMF, a communication service management function CSMF, a network functions virtualization orchestration NFVO function, and a virtualized network function manager VNFM.

Optionally, the first network device 50 may be the foregoing NSMAO, and the second network device may be an NRF.

It should be noted that, for functions of the functional modules of the first network device 50 described in this embodiment of the present invention, refer to the related descriptions corresponding to the first network device in the embodiment shown in FIG. 2. Details are not described herein again.

Figure 6:
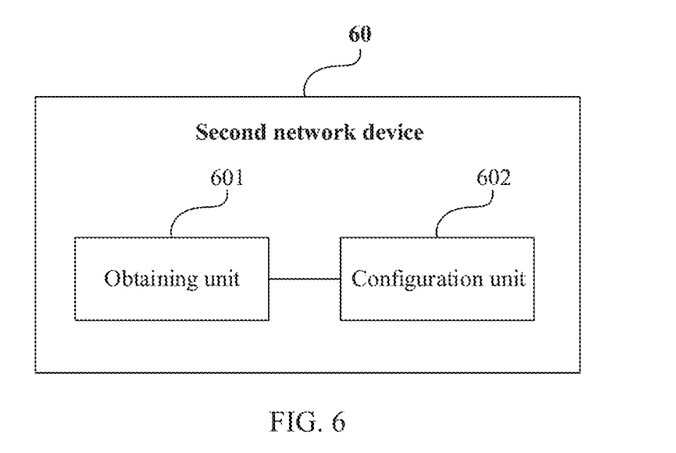
FIG. 6 is a schematic structural diagram of another network device according to an embodiment of the present invention.

FIG. 6 is a schematic structural diagram of another network device according to an embodiment of the present invention. As shown in FIG. 6, a second network device 60 includes an obtaining unit 601 and a configuration unit 602.

In this embodiment of the present invention, the obtaining unit 601 is configured to obtain a configuration parameter sent by a first network device, where the configuration parameter includes a network slice instance identifier and an access and mobility management function identifier corresponding to the network slice instance identifier, and/or a network slice subnet instance identifier and an access and mobility management function identifier corresponding to the network slice subnet instance identifier; and the configuration unit 602 is configured to configure the configuration parameter.

In this embodiment, the second network device 60 is presented in a form of functional units. The "unit" herein may be an ASIC, a processor executing one or more software or firmware programs and a memory, an integrated logic circuit, and/or another component that can provide the foregoing functions. The second network device 60 may be in a form shown in FIG. 4. The obtaining unit 601 may be implemented by the transceiver 403 in FIG. 4. The configuration unit 602 may be implemented by the processor 401 in FIG. 4.

Optionally, the configuration parameter further includes assistance information, and the assistance information is used to instruct the second network device 60 to select the access and mobility management function identifier.

Optionally, the assistance information includes one or any combination of a priority, location information, access technology information, traffic load, and a quantity of access users.

The priority is used to indicate a priority of the access and mobility management function identifier.

The location information includes one or any combination of a tracking area identity TAI, a routing area identity RAI, and an evolved-universal mobile telecommunications system terrestrial radio access network cell global identifier ECGI.

The access technology information is used to indicate an access technology used when user equipment accesses a network slice instance and/or a network slice subnet instance.

Optionally, the second network device 60 further includes a sending unit.

The sending unit is configured to: after the configuration unit 602 configures the configuration parameter, send a configuration result to the first network device, where the configuration result is used to indicate a completion status of configuring the configuration parameter by the second network device.

Optionally, the access and mobility management function identifier includes a globally unique access and mobility management function identifier corresponding to an access and mobility management function or an internet protocol address of the access and mobility management function.

Optionally, the first network device is one or any combination of a network manager NM, a domain manager DM, an element manager EM, a network slice management function NSMF, a network slice subnet management function NSSMF, a communication service management function CSMF, a network functions virtualization orchestration NFVO function, and a virtualized network function manager VNFM.

Optionally, the first network device is the foregoing NSMAO, and the second network device 60 is an NRF.

It should be noted that, for functions of the functional modules of the second network device 60 described in this embodiment of the present invention, refer to the related descriptions corresponding to the second network device in the embodiment shown in FIG. 2. Details are not described herein again.

Figure 7:
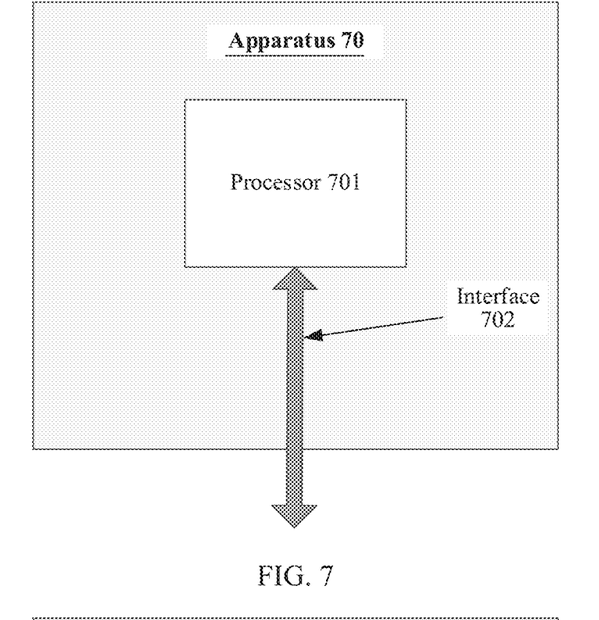
FIG. 7 is a schematic structural diagram of an apparatus according to an embodiment of the present invention.

FIG. 7 is a schematic structural diagram of an apparatus according to an embodiment of the present invention. As shown in FIG. 7, an apparatus 70 may include a processor 701 and one or more interfaces 702 coupled to the processor 701.

The processor 701 may be configured to read and execute a computer-readable instruction. In a specific implementation, the processor 701 may mainly include a controller, an arithmetic unit, and a register. The controller is mainly responsible for decoding an instruction, and sending a control signal for an operation corresponding to the instruction. The arithmetic unit is mainly responsible for performing a fixed-point or floating-point arithmetic operation, a shift operation, a logical operation, and the like, and may also perform an address operation and an address conversion. The register is mainly responsible for saving a register operand, an intermediate operation result, and the like that are temporarily stored during instruction execution. In a specific implementation, a hardware architecture of the processor 701 may be an application-specific integrated circuit (ASIC) architecture, or the like. The processor 701 may be single-core or multi-core.

The interface 702 may be configured to input to-be-processed data to the processor 701, and may output a processing result of the processor 701.

In this application, the processor 701 may be configured to invoke, from a memory, a program for implementing, on a first network device side, the network management method provided in one or more embodiments of this application, and execute an instruction included in the program. The interface 702 may be configured to output an execution result of the processor 701. For the network management method provided in the one or more embodiments of this application, refer to the foregoing embodiments, and details are not described herein again.

It should be noted that functions respectively corresponding to the processor 701 and the interface 702 may be implemented by using a hardware design, may be implemented by using a software design, or may be implemented in a combination of software and hardware. This is not limited herein.

Figure 8:
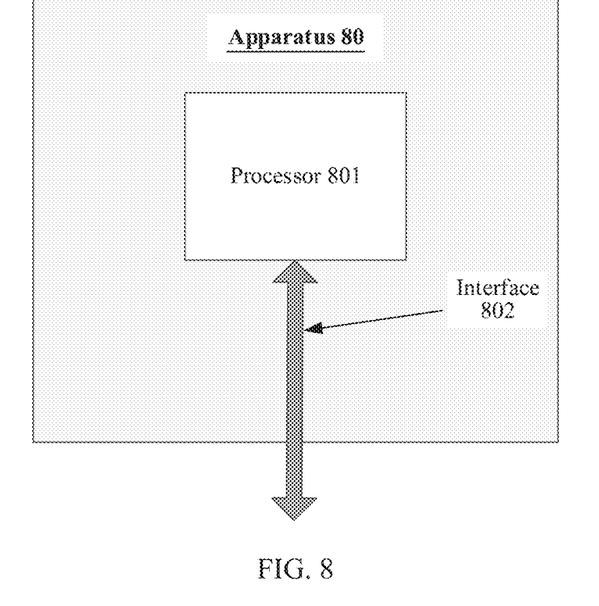
FIG. 8 is a schematic structural diagram of another apparatus according to an embodiment of the present invention.

FIG. 8 is a schematic structural diagram of another apparatus according to an embodiment of the present invention. As shown in FIG. 8, an apparatus 80 may include a processor 801 and one or more interfaces 802 coupled to the processor 801.

The processor 801 may be configured to read and execute a computer-readable instruction. In a specific implementation, the processor 801 may mainly include a controller, an arithmetic unit, and a register. The controller is mainly responsible for decoding an instruction, and sending a control signal for an operation corresponding to the instruction. The arithmetic unit is mainly responsible for performing a fixed-point or floating-point arithmetic operation, a shift operation, a logical operation, and the like, and may also perform an address operation and an address conversion. The register is mainly responsible for saving a register operand, an intermediate operation result, and the like that are temporarily stored during instruction execution. In a specific implementation, a hardware architecture of the processor 801 may be an application-specific integrated circuit (ASIC) architecture, or the like. The processor 801 may be single-core or multi-core.

The interface 802 may be configured to input to-be-processed data to the processor 801, and may output a processing result of the processor 801.

In this application, the processor 801 may be configured to invoke, from a memory, a program for implementing, on a second network device side, the network management method provided in one or more embodiments of this application, and execute an instruction included in the program. The interface 802 may be configured to output an execution result of the processor 801. For the network management method provided in the one or more embodiments of this application, refer to the foregoing embodiments, and details are not described herein again.

It should be noted that functions respectively corresponding to the processor 801 and the interface 802 may be implemented by using a hardware design, may be implemented by using a software design, or may be implemented in a combination of software and hardware. This is not limited herein.

Methods or algorithm steps described in combination with the content disclosed in the embodiments of the present invention may be implemented by hardware, or may be implemented by a processor executing a software program instruction. The software program instruction may include a corresponding software module. The software module may be stored in a RAM, a flash memory, a ROM, an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a transceiver or a relay device. Certainly, the processor and the storage medium may exist as discrete components in a first network device or a second network device.

A person skilled in the art should be aware that in the foregoing one or more examples, functions described in the embodiments of the present invention may be implemented by hardware, software, firmware, or any combination thereof. When the functions are implemented by software, the functions may be stored in a computer-readable medium or transmitted as one or more program instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, improvement, or the like made based on the technical solutions of the embodiments of the present invention shall fall within the protection scope of the embodiments of the present invention.

What is claimed is:

1. A network management method, comprising:
 obtaining, by a first network device, a configuration parameter, wherein the configuration parameter comprises at least one of following:
  a network slice instance identifier, and an access and mobility management function identifier corresponding to the network slice instance identifier; or
  a network slice subnet instance identifier, and an access and mobility management function identifier corresponding to the network slice subnet instance identifier; and
 sending, by the first network device, the configuration parameter to a second network device, wherein the configuration parameter further comprises assistance information, and wherein the assistance information is used to instruct the second network device to select the access and mobility management function identifier.

2. The method according to claim 1, wherein the assistance information comprises at least one of a priority, location information, access technology information, traffic load, or a quantity of access users;
 wherein the priority is used to indicate a priority of the access and mobility management function identifier;
 wherein the location information comprises at least one of a tracking area identity (TAI), a routing area identity (RAI), or an evolved-universal mobile telecommunications system terrestrial radio access network cell global identifier (ECGI); and
 wherein the access technology information is used to indicate an access technology used when user equipment accesses at least one of a network slice instance or a network slice subnet instance.

3. The method according to claim 1, wherein after the sending, by the first network device, the configuration parameter to a second network device, the method further comprises:
 obtaining, by the first network device, a configuration result sent by the second network device, wherein the configuration result is used to indicate a completion status of configuring the configuration parameter by the second network device.

4. The method according to claim 1, wherein the access and mobility management function identifier comprises a globally unique access and mobility management function identifier corresponding to an access and mobility management function or an internet protocol address of the access and mobility management function.

5. The method according to claim 1, wherein the first network device is at least one of a network manager (NM), a domain manager (DM), an element manager (EM), a network slice management function (NSMF), a network slice subnet management function (NSSMF), a communication service management function (CSMF), a network functions virtualization orchestration (NFVO) function, or a virtualized network function manager (VNFM).

6. A network management method, comprising:
 obtaining, by a second network device, a configuration parameter sent by a first network device, wherein the configuration parameter comprises at least one of following:
  a network slice instance identifier, and an access and mobility management function identifier corresponding to the network slice instance identifier; or
  a network slice subnet instance identifier and an access and mobility management function identifier corresponding to the network slice subnet instance identifier; and
 configuring, by the second network device, the configuration parameter, wherein the configuration parameter further comprises assistance information, and wherein the assistance information is used to instruct the second network device to select the access and mobility management function identifier.

7. The method according to claim 6, wherein the assistance information comprises at least one of a priority, location information, access technology information, traffic load, or a quantity of access users;
 wherein the priority is used to indicate a priority of the access and mobility management function identifier;

wherein the location information comprises at least one of of a tracking area identity (TAI), a routing area identity (RAI), or an evolved-universal mobile telecommunications system terrestrial radio access network cell global identifier (ECGI); and wherein the access technology information is used to indicate an access technology used when user equipment accesses at least one of a network slice instance or a network slice subnet instance.

8. The method according to claim 6, wherein after the configuring, by the second network device, the configuration parameter, the method further comprises:
sending, by the second network device, a configuration result to the first network device, wherein the configuration result is used to indicate a completion status of configuring the configuration parameter by the second network device.

9. The method according to claim 6, wherein the access and mobility management function identifier comprises a globally unique access and mobility management function identifier corresponding to an access and mobility management function or an internet protocol address of the access and mobility management function.

10. The method according to claim 6, wherein the first network device is at least one of a network manager (NM), a domain manager (DM), an element manager (EM), a network slice management function (NSMF), a network slice subnet management function (NSSMF), a communication service management function (CSMF), a network functions virtualization orchestration (NFVO) function, and a virtualized network function manager (VNFM).

11. A network device, wherein the network device is a first network device, and wherein the first network device comprises:
at least one processor; and
a memory storing instructions executable by the at least one processor, wherein the instructions, when executed by the at least one processor, instruct the at least one processor to:
obtain a configuration parameter, wherein the configuration parameter comprises at least one of following:
a network slice instance identifier, and an access and mobility management function identifier corresponding to the network slice instance identifier; or
a network slice subnet instance identifier, and an access and mobility management function identifier corresponding to the network slice subnet instance identifier; and
send the configuration parameter to a second network device, wherein the configuration parameter further comprises assistance information, and wherein the assistance information is used to instruct the second network device to select the access and mobility management function identifier.

12. The network device according to claim 9, wherein the assistance information comprises at least one of a priority, location information, access technology information, traffic load, or a quantity of access users;

wherein the priority is used to indicate a priority of the access and mobility management function identifier;

wherein the location information comprises one or any combination of a tracking area identity (TAI), a routing area identity (RAI), or an evolved-universal mobile telecommunications system terrestrial radio access network cell global identifier (ECGI); and wherein the access technology information is used to indicate an access technology used when user equipment accesses at least one of a network slice instance or a network slice subnet instance.

13. The network device according to claim 11, wherein the instructions further instruct the at least one processor to: after sending the configuration parameter to the second network device, obtain a configuration result sent by the second network device, wherein the configuration result is used to indicate a completion status of configuring the configuration parameter by the second network device.

14. The network device according to claim 11, wherein the access and mobility management function identifier comprises:
a globally unique access and mobility management function identifier corresponding to an access and mobility management function; or
an internet protocol address of the access and mobility management function.

15. The network device according to claim 11, wherein the first network device is at least one of a network manager (NM), a domain manager (DM), an element manager (EM), a network slice management function (NSMF), a network slice subnet management function (NSSMF), a communication service management function (CSMF), a network functions virtualization orchestration (NFVO) function, and a virtualized network function manager (VNFM).

16. A network device, wherein the network device is a second network device, and wherein the second network device comprises:
at least one processor; and
a memory storing instructions executable by the at least one processor, wherein the instructions, when executed by the at least one processor, instruct the at least one processor to:
obtain a configuration parameter sent by a first network device, wherein the configuration parameter comprises at least one of following:
a network slice instance identifier, and an access and mobility management function identifier corresponding to the network slice instance identifier; or
a network slice subnet instance identifier and an access and mobility management function identifier corresponding to the network slice subnet instance identifier; and
configure the configuration parameter, wherein the configuration parameter further comprises assistance information, and wherein the assistance information is used to instruct the second network device to select the access and mobility management function identifier.

* * * * *